July 31, 1956  A. E. ARMSTRONG  2,756,770
PRESSURE REDUCING VALVE ASSEMBLY
Filed Oct. 6, 1952
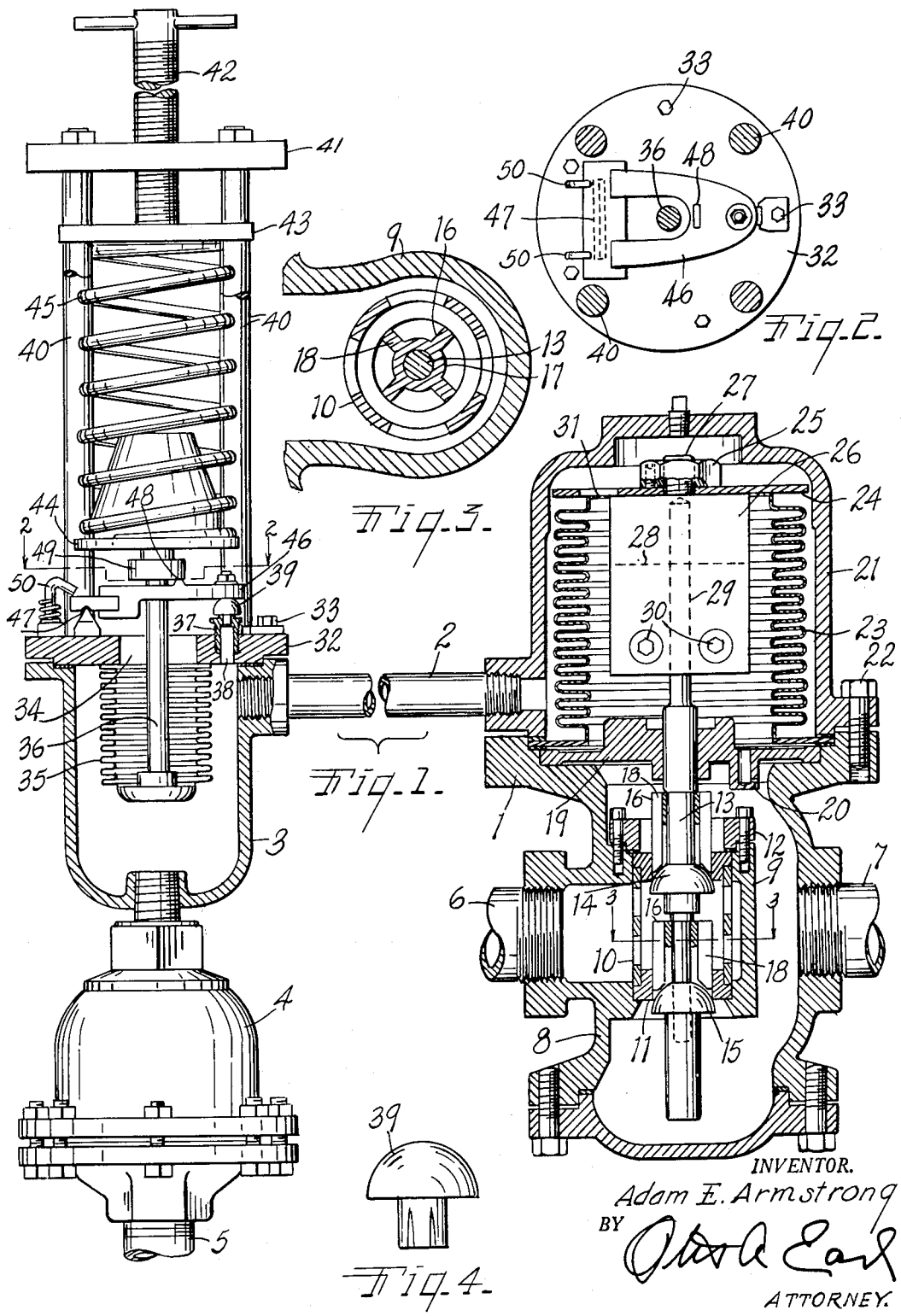
INVENTOR.
Adam E. Armstrong
BY
ATTORNEY.

United States Patent Office 2,756,770
Patented July 31, 1956

2,756,770

PRESSURE REDUCING VALVE ASSEMBLY

Adam E. Armstrong, Three Rivers, Mich., assignor to Armstrong Machine Works, Three Rivers, Mich.

Application October 6, 1952, Serial No. 313,338

8 Claims. (Cl. 137—489)

This invention relates to improvements in a pressure reducing valve assembly.

The principal objects of this invention are:

First, to provide a pressure reducing valve assembly which is very accurate in its control of the pressure reduction and which requires a minimum of external or cooperating structure.

Second, to provide a reducing valve assembly which is entirely automatic and requires no external source of energy.

Third, to provide a pressure reducing valve assembly that is easy to manufacture to accurately controlled limits.

Fourth, to provide a novel form of reducing valve including a balanced valve structure that is easily and accurately manufactured to be perfectly balanced.

Other objects and advantages of the invention will be apparent from a consideration of the following description and claims. The drawings, of which there are 2 sheets, illustrate a highly practical embodiment of the valve assembly and one possible use thereof.

Fig. 1 is a vertical cross sectional view through the valve assembly in operative position.

Fig. 2 is a fragmentary horizontal cross sectional view through the relief valve regulating means taken along the plane of the line 2—2 in Fig. 1.

Fig. 3 is a fragmentary horizontal cross sectional view through the balanced valve structure of the main reducing valve along the plane of the line 3—3 in Fig. 1.

Fig. 4 is an enlarged detailed view of the relief valve element of the relief valve structure.

The valve assembly generally consists of a reducing valve 1 interconnected by a pipe 2 with a relief valve 3. A water trap 4 and drain pipe 5 are provided for drawing off condensate from the relief valve. The valve seats are shouldered to fit within and seat against the ends of the carrier 10. The lower seat 11 seats against the shouldered lower wall of the housing 9 and the ring 12 clamps against the upper seat 11. A pressure or supply pipe 6 is attached to one side of the reducing valve while a delivery or low pressure pipe 7 is connected to the other side thereof.

More specifically the reducing valve 1 comprises a chambered body 8 having a housing 9 projecting into the interior of the body and opening to the supply pipe 6. The housing 9 is vertically bored or open at the top and bottom to receive a perforate cylindrical carrier 10. The ends of the carrier 10 are each provided with an annular valve seat 11 with the seating ends or edges of the seats each facing downwardly. The carrier 10 and valve seats 11 are clamped in place by an annular ring 12 screwed to the top of the housing 9.

Extending axially through the carrier 10 and the valve seats 11 is a valve stem 13 having an upper valve element 14 and a lower valve element 15 fixedly secured thereon. The valve elements 14 and 15 are pressed tightly onto the valve stem so as to simultaneously seat against the valve seats 11. The valve stem and the valve elements are guided with respect to the valve seats by means of guides 16 carried by the valve stem. The valves are easily applied to the stem in proper position by placing one, say the valve 14, in approximate proper position and then assembling the seats and carrier and valve 14 in position in a temporary support or jig. The valve 15 can then be pressed on to engage the lower seat 11 and the pressure will hold valve 14 in proper position. The guides 16 as illustrated include the rings 17 sleeved upon the valve stem and the guide arms 18 carried thereby and which slidably engage the interior surfaces of the valve seat members 11.

The upper end of the valve body 8 above the housing 9 is open and is adapted to be closed by the end plate 19 seated in a suitable shoulder formed in the end of the body. The end plate 19 is centrally bored to pass the stem 13 and is further provided with a bleed passage 20 that opens between the low pressure side of the valve and the upper surface of the plate. Clamping the end plate 19 in position is a domed casing 21 that is secured in place by cap screws 22. The casing also serves to clampingly seal the lower open end of an expansible bellows 23 to the body 8 and around the stem 13. The upper end of the bellows 23 is closed by a plate 24 that is clamped to the bellows by being received between the nut 25 and the upper surface of a weight 26 having a threaded stud 27 extending upwardly through the nut. The lower portion of the weight 26 is transversely slotted as indicated by the dotted line 28 and is axially bored as at 29 to receive the upper end of the valve stem 13. Clamp screws 30 extending through the opposite sides of the slotted weight serve to securely clamp the weight to the valve stem and to also connect the stem to the movable upper end of the bellows. It will thus be seen that the weight serves to overcome any friction of the valve stem guides in the valve seats and to preload the bellows 23. The valve elements 14 and 15 are thus normally biased to open position.

The upper end of the bellows 23 and the plate 24 are provided with a bleed passage at 31 opening into the interior of the casing 21. The interior of the bellows thus has a restricted communication through the casing 21 and pipe 2 to the interior of the relief valve 3.

The upper end of the relief valve 3 is formed open and is adapted to be closed by the end plate 32 secured in place by cap screws 33. The end plate 32 is centrally apertured as at 34 and has the upper open end of a bellows 35 secured to its under side around the aperture 34. The lower closed end of the bellows 35 is connected to a plunger 36 that projects upwardly through the opening 34 to above the body of the relief valve.

The plate 32 also carries fitting 37 having a small relief passage 38 formed therethrough. The relief passage 38 is adapted to be closed by the upwardly opening relief valve element 39 having a hemispherical upper surface. Secured to and projecting upwardly from the end plate 32 are 4 rods 40 spaced around the end plate and connected at their upper end by a cross plate 41. The rods 40 and plate 41 form a yoke through the upper end of which a screw 42 is adjustably movable. The lower end of the screw 41 carries an abutment plate 43 and the upper end of the plunger 36 carries a lower abutment plate 44. A strong spring 45 is adjustably compressed between the abutment plates 43 and 44.

The relief valve element 39 is biased to closed position by having one end of a lever 46 pressed thereagainst. The lever 46 is bifurcated as is most clearly shown in Fig. 2 to embrace the plunger 36 and is supported at its opposite end on a knife edge 47. Intermediate of its ends the lever 46 has an upstanding projection 48 that engages and is pressed downwardly by a collar 49 on the plunger 36. Thus the adjustable pressure of the spring 45 is exerted to hold the relief valve 39 closed. The lever 46 is held or urged against the knife edge 47 by a pair of hooked springs.

The water trap 4 is connected to the bottom of the body of the relief valve and operates in a well known manner to keep the relief valve body free from condensate.

When steam pressure is supplied through the supply pipe 6 to the housing 9 within the reducing valve body 8, the valve elements 14 and 15 will normally be biased by the weight 26 to open position as was previously described. Depending upon the conditions existing in the delivery pipe 7 steam pressure will accordingly build up within the body 8 and be transmitted through the bleed passage 20 to the interior of the bellows 23. The pressure will also build up by communication through the bleed passage 31 to the interior of the casing 21 and the interior of the relief valve body 3. The bellows 23 will accordingly be balanced and the valve elements 14 and 15 will remain open until such time as the pressure in the various portions of the valve assembly rises to a predetermined pressure that is sufficient to unseat the relief valve 39 against the adjusted pressure of the spring 45.

The release of pressure from the relief valve body 3 and from around the exterior of the bellows 23 will unbalance the pressure on bellows faster than the pressure can be equalized through the bleed passage 31 and the relative increase of pressure within the bellows 23 will result in the bellows expanding upwardly and carrying the valve elements 14 and 15 to closed position.

After the desired pressure has been established within the low pressure side of the reducing valve a subsequent drop in pressure due to the withdrawal or condensation of steam in the delivery pipe 7 will result in the pressure within the bellows 23 dropping correspondingly. The relative pressure outside of the bellows 23 will then be high and the bellows will collapse downwardly moving the valve elements 14 and 15 to open position to reestablish the desired pressure in the delivery pipe 7.

It is pointed out that the valve assembly creates its own balancing pressure in the relief valve 3 and around the bellows 23 which balancing pressure is continuously restored or maintained at an adjustably predeterminable level. This balancing pressure is opposed to the reduced pressure which it is desired to maintain within the delivery pipe 7 and the interior of the bellows 23. Thus the valve assembly is entirely automatic and self-sustaining and requires no external source of balancing pressure. At the same time the reducing valve elements 14 and 15 are nicely balanced and operated solely by movement of the bellows 23 as a result of any unbalance between the reduced pressure and the predetermined balancing pressure.

A highly practical embodiment of the invention has thus been described in sufficient detail to permit others to reproduce and operate the valve apparatus with such modifications thereof as may appear desirable and which may fall within the scope of the invention as defined in the claims.

Having thus described my invention, what I claim as new and desire to secure by Letters Patent is:

1. A pressure reducing valve assembly comprising, a first valve body having inlet and outlet openings thereto, an inlet casing projecting into said body and communicating with said inlet opening, a perforate tubular carrier mounted in said casing and opening at each end into said first body, valve seats secured within each end of said carrier and facing in the same direction, a valve rod reciprocable through said carrier and said valve seats, valve elements pressed on said valve rod to simultaneously engage and close on said valve seats, guide members carried on said rod and engageable with the inner periphery of said valve seats, a removable plate attached to one side of said first body and having an opening therein passing said rod, and expansible bellows clamped to said plate and embracing the outer end of said valve rod, a housing clamped to said first body and enclosing said bellows, said plate having a bleed opening formed therein between the interior of said body and the interior of said bellows, a weight clamped to said valve rod and bellows to bias said valve rod and valves to open position, said bellows having a second bleed opening formed therein and opening to the interior of said housing, a second valve body connected to said housing and communicating with said housing exteriorly of said first bellows, a water trap opening from said second body, a second expansible bellows positioned in said second body, an end plate on said second body to which said second bellows is secured and sealed, a yoke carried by said end plate and projecting therefrom, an adjustable screw mounted on the outer end of said yoke for adjustment toward and away from said end plate, a plunger engaged with the inner end of said second bellows and extending through said end plate toward said screw, a spring adjustably compressed between said plunger and said screw, a relief valve opening formed in said end plate adjacent to said plunger and opening at its inner end to the interior of said second body and exteriorly of said second bellows, an outwardly opening relief valve positioned in said relief valve opening, a lever bearing against said relief valve and having an abutment bearing against said plunger in opposition to the opening force of the relief valve, a knife-edge pivot on said end plate for said lever and positioned on the opposite side of said plunger from said relief valve, and spring anchors yieldably engaging the opposite end of said lever from said relief valve and biasing said lever to relief valve opening position.

2. A pressure reducing valve assembly comprising, a first valve body having inlet and outlet openings thereto, an inlet casing projecting into said body and communicating with said inlet opening, a perforate tubular carrier mounted in said casing and opening at each end into said first body, valve seats secured within each end of said carrier and facing in the same direction, a valve rod reciprocable through said carrier and said valve seats, valve elements secured on said valve rod to simultaneously engage and close on said valve seats, guide members carried on said rod and engageable with the inner periphery of said valve seats, a removable plate attached to one side of said first body and having an opening therein passing said rod, and expansible bellows clamped to and embracing the outer end of said valve rod, a housing clamped to said first body and enclosing said bellows, said plate having a bleed opening formed therein between the interior of said body and the interior of said bellows, a weight clamped to said valve rod to bias said valve rod and valves to open position, said bellows having a second bleed opening formed therein and opening to the interior of said housing, a second valve body connected to said housing and communicating with said housing exteriorly of said first bellows, a water trap opening from said second body, a second expansible bellows positioned in said second body, an end plate on said second body to which said second bellows is secured and sealed, a yoke carried by said end plate and projecting therefrom, an adjustable screw mounted on the outer end of said yoke for adjustment toward and away from said end plate, a plunger engaged with the inner end of said second bellows and extending through said end plate toward said screw, a spring adjustably compressed between said plunger and said screw, a relief valve opening formed in said end plate adjacent to said plunger and opening at its inner end to the interior of said second body and exteriorly of said second bellows, an outwardly opening relief valve positioned in said relief valve opening, a lever bearing against said relief valve and having an abutment bearing against said plunger in opposition to the opening force of the relief valve, and a knife-edge pivot on said end plate for said lever.

3. A pressure reducing valve assembly comprising, a first valve body having inlet and outlet openings thereto, an inlet casing projecting into said body and communicating with said inlet opening, a perforate tubular carrier mounted in said casing and opening at each end into said first body, valve seats positioned within each end of said carrier and facing in the same direction, a valve rod reciprocable through said carrier and said valve seats, valve elements on said valve rod positioned to simultaneously engage and close on said valve seats, guide members for said rod and engageable with the inner periphery of said valve seats to guide said rod, one side of said first body having an opening therein passing said rod, and expansible bellows clamped to said one side and embracing the outer end of said valve rod, a housing clamped to said first body and enclosing said bellows, said one side having a bleed opening formed therein between the interior of said body and the interior of said bellows, a weight clamped to said valve rod and bellows to bias said valve rod and valves to open position, said bellows having a second bleed opening formed therein and opening to the interior of said housing, a second valve body connected to said housing and communicating with said housing exteriorly of said first bellows, a water trap opening from said second body, a second expansible bellows positioned in said second body, an end plate on said second body to which said second bellows is secured and sealed, a yoke carried by said end plate and projecting therefrom, an adjustable screw mounted on the outer end of said yoke for adjustment toward and away from said end plate, a plunger engaged with the inner side of said second bellows and extending through said end plate toward said screw, a spring adjustably compressed between said plunger and said screw, a relief valve opening formed in said end plate adjacent to said plunger, and opening at its inner end to the interior of said second body and exteriorly of said second bellows, a relief valve positioned in said relief valve opening, a lever bearing against said relief valve and having an abutment bearing against said plunger in opposition to the opening force of the relief valve on said lever, and a pivot on said end plate for said lever and positioned on the opposite side of said abutment from said relief valve.

4. A pressure reducing valve assembly comprising, a first valve body having inlet and outlet openings thereto, an inlet casing projecting into said body and communicating with said inlet opening, a perforate tubular carrier mounted in said casing and opening at each end into said first body, valve seats positioned within each end of said carrier and facing in the same direction, a valve rod reciprocable through said carrier and said valve seats, valve elements on said valve rod positioned to simultaneously engage and close on said valve seats, guide members for said rod and engageable with the inner periphery of said valve seats to guide said rod, one side of said first body having an opening therein passing said rod, an expansible bellows clamped to and embracing the outer end of said valve rod, a housing clamped to first body and enclosing said bellows, said one side having a bleed opening formed therein between the interior of said first body and the interior of said bellows, a weight clamped to said valve rod to bias said valve rod and valves to open position, said bellows having a second bleed opening formed therein and opening to the interior of said housing, a second valve body connected to said housing and communicating with said housing exteriorly of said first bellows, a water trap opening from said second body, a second expansible bellows positioned in said second body, a yoke carried by said second body and projecting therefrom, an adjustable screw mounted on the outer end of said yoke for adjustment toward and away from second body, a plunger engaged with the inner side of said second bellows and extending through said second body toward said screw, a spring adjustably compressed between said plunger and said screw, a relief valve opening formed in said second body adjacent to said plunger and opening at its inner end to the interior of said second body and exteriorly of said second bellows, a relief valve positioned in said relief valve opening, a lever bearing against said relief valve and having an abutment bearing against said plunger in opposition to the opening force of the relief valve on said lever, and a pivot on said second body for said lever and positioned on the opposite side of said abutment from said relief valve.

5. A reducing valve assembly comprising, a first valve body having pressure inlet and outlet connections opening thereto, a balanced valve in said body and between said inlet and outlet connections, a stem for said valve extending outwardly from said body, an expansible bellows connected to and embracing the outer end of said stem, a casing enclosing said bellows, said body having a first bleed opening communicating between the interior of said bellows and the interior of said body inwardly of said valve, said bellows having a second bleed opening therein opening into the interior of said casing, a second valve body communicating with said casing exteriorly of said first bellows, a second bellows positioned in said second body and subject on one side to the pressure in said casing and in said second body, a relief valve opening formed in said second body and opening to the exterior of said second body from said one side of said second bellows, a plunger connected to said second bellows and extending exteriorly of said second body, the other side of said second bellows being subject to the pressure exterior to said second body, adjustable spring means for biasing said plunger and said second bellows against the pressure in said second body, a relief valve positioned in said relief valve opening in said second body, and a lever positioned between said relief valve and said plunger to variably urge said relief valve to closed position.

6. A reducing valve assembly comprising, a valve body having pressure inlet and outlet connections opening thereto, a balanced valve in said body and between said inlet and outlet connections, a stem for said valve extending outwardly from said body, an expansible bellows connected to and embracing the outer end of said stem, a casing enclosing said bellows, said body having a first bleed opening communicating between the interior of said bellows and the interior of said body inwardly of said valve, said bellows having a second bleed opening therein opening into the interior of said casing, means forming a chamber communicating with said casing exteriorly of said first bellows, said chamber having a relief port formed therein and opening to the atmosphere exteriorly of said means, a second bellows positioned in said chamber and subject on one side to the pressure in said chamber, said second bellows being open on the other side to the atmosphere exteriorly of said chamber, a plunger connected to said second bellows and extending exteriorly of said chamber, adjustable spring means for biasing said plunger and said second bellows against the pressure in said chamber, a relief valve coacting with said relief port, and a lever positioned between said relief valve and said plunger to variably urge said relief valve to closed position.

7. A pressure reducing valve assembly comprising, a first valve body having pressure inlet and outlet openings therein, a balanced valve structure positioned in said body and located between said inlet and outlet openings, a valve stem for said balanced valve structure and extending exteriorly of said body, an expansible element embracing and connected to the outer end of said stem, said body having a bleed opening formed therein communicating between the low pressure area within the body and the interior of said element, a casing enclosing said element, said element having a second bleed opening formed therein communicating with the interior of said casing, means forming a chamber communicating with the interior of said casing, a second expansible element positioned in said chamber and subject to the pressure therein, a plunger movable responsive to movement of said second element and extending exteriorly of said chamber, said chamber having a relief port, a valve coacting with said relief port and urged to open position by pressure in said chamber, spring means adjustably opposing movement of said plunger outwardly of said chamber, and a lever extending between said relief valve and said plunger whereby said spring means adjustably opposes opening motion of said relief valve.

8. A pressure reducing valve assembly comprising, a first valve body having pressure inlet and outlet openings therein, a balanced valve structure positioned in said body and located between said inlet and outlet openings, a valve stem for said balanced valve structure and extending exteriorly of said body, an expansible element embracing and connected to the outer end of said stem, said body having a bleed opening formed therein communicating between the low pressure area within the body and the interior of said element, a casing enclosing said element, said element having a second bleed opening formed therein communicating with the interior of said casing, means forming a chamber communicating with the interior of said casing, a second expansible element positioned in said chamber and subject on one side to the pressure therein, a plunger movable responsive to movement of said second element and extending exteriorly of said chamber, said chamber having a relief port, a relief valve coacting with said relief port and urged to open position by pressure in said chamber, spring means adjustably opposing movement of said plunger outwardly of said chamber, and means forming a driving connection between said relief valve and said plunger whereby said spring means adjustably opposes opening motion of said relief valve.

References Cited in the file of this patent

UNITED STATES PATENTS

| | | |
|---|---|---|
| 360,607 | McGann | Apr. 5, 1887 |
| 794,651 | Willits | July 11, 1905 |
| 841,469 | Turner | Jan. 15, 1907 |
| 1,813,222 | Barrett | July 7, 1931 |
| 1,883,571 | Clark | Oct. 18, 1932 |
| 1,900,736 | Richardson | Mar. 7, 1933 |
| 1,991,032 | Spence | Feb. 12, 1935 |
| 2,312,251 | Johnson | Feb. 23, 1943 |

FOREIGN PATENTS

| | | |
|---|---|---|
| 4,753 | Sweden | Dec. 16, 1893 |
| 390,444 | Great Britain | Apr. 6, 1933 |